(12) United States Patent
Cai et al.

(10) Patent No.: US 6,175,834 B1
(45) Date of Patent: Jan. 16, 2001

(54) CONSISTENCY CHECKER FOR DOCUMENTS CONTAINING JAPANESE TEXT

(75) Inventors: Patrick Pei Cai, Redmond; Patrick H. Halstead, Bellevue, both of WA (US)

(73) Assignee: Microsoft Corporation, Redmond, WA (US)

( * ) Notice: Under 35 U.S.C. 154(b), the term of this patent shall be extended for 0 days.

(21) Appl. No.: 09/104,257

(22) Filed: Jun. 24, 1998

(51) Int. Cl.[7] .................................................. G06F 17/00
(52) U.S. Cl. .............................. 707/102; 704/10; 434/156
(58) Field of Search ..................................... 707/102–104, 707/1–4; 434/156, 167, 169; 704/10

(56) References Cited

U.S. PATENT DOCUMENTS

| 5,258,909 | * | 11/1993 | Damerau et al. | 707/533 |
|---|---|---|---|---|
| 5,321,801 | | 6/1994 | Ando | 707/535 |
| 5,448,474 | | 9/1995 | Zamora | 704/9 |
| 5,535,119 | | 7/1996 | Ito et al. | 704/3 |
| 5,634,066 | | 5/1997 | Takehara et al. | 707/535 |
| 5,634,134 | | 5/1997 | Kumai et al. | 707/536 |
| 5,715,469 | * | 2/1998 | Arning | 707/533 |
| 5,963,893 | * | 10/1999 | Halstead, Jr. et al. | 704/9 |

FOREIGN PATENT DOCUMENTS

| 0287713A1 | 10/1988 | (EP) . |
|---|---|---|
| 0798652A2 | 10/1997 | (EP) . |
| WO98/00794 | 6/1997 | (WO) . |

OTHER PUBLICATIONS

Cormen et al., "Dynamic Programming," Chapter 16, *Introduction to Algorithms*, The MIT Press, Cambridge, MA, ©*1990 by The Massachusetts Institute of Technology, pp. 301–312.*

* cited by examiner

*Primary Examiner*—Hosain T. Alam
*Assistant Examiner*—Jean Bolte Fleurantin
(74) *Attorney, Agent, or Firm*—Kirkpatrick Stockton LLP

(57) ABSTRACT

A Consistency Checker provides an improved method of analyzing a Japanese text document to identify inconsistently spelled words. The Consistency Checker utilizes a Reading Pair Database (RPD) and a Compressed Lexicon Database (CLD) to determine the reading units within a word, to calculate a Reading Pair Identification Number (RID) for each reading unit, to calculate a Sense Identification Number (SID) for each word, and to calculate a Spelling Variant Identification Number (SVID) for each word. Spelling variants are generated by combining variations of individual RIDs in the RID array. A Registry is updated to maintain statistics on all of the words within the document. An error field within the Registry indicates that the document contains more than one spelling variant of a particular word. The client program can access the Registry to alert a user to inconsistencies discovered in the document. The RPD comprises a list of reading pairs correlating Japanese text reading units of one character set with equivalent Japanese text reading units of another character set. Equivalent reading units from each character set are combined to form a reading pair and each reading pair is assigned a RID. A method is provided for generating the RPD by analyzing a list of Japanese words and a list of Japanese word equivalents having different spellings. Reading units are discovered by splitting the words at common dividing points and eliminating low-occurrence reading units until a set of high-occurrence reading units is defined.

39 Claims, 8 Drawing Sheets

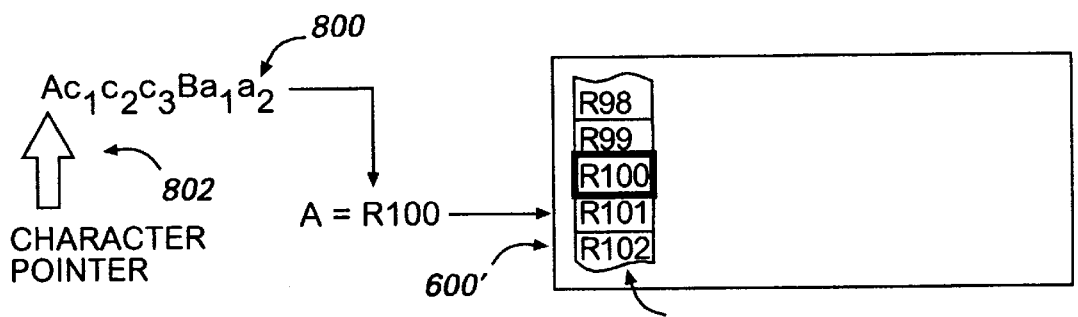
FIG. 8a
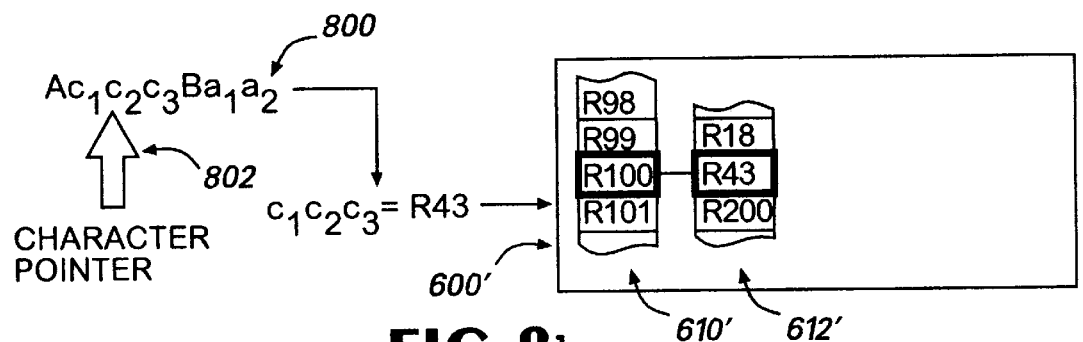
FIG. 8b
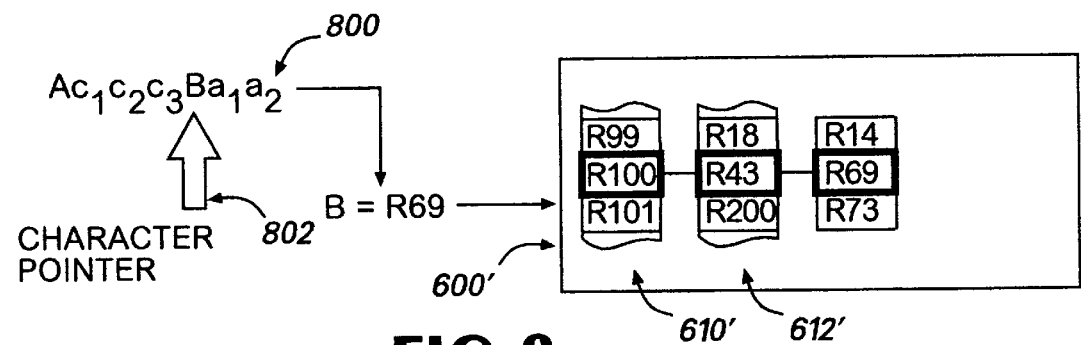
FIG. 8c
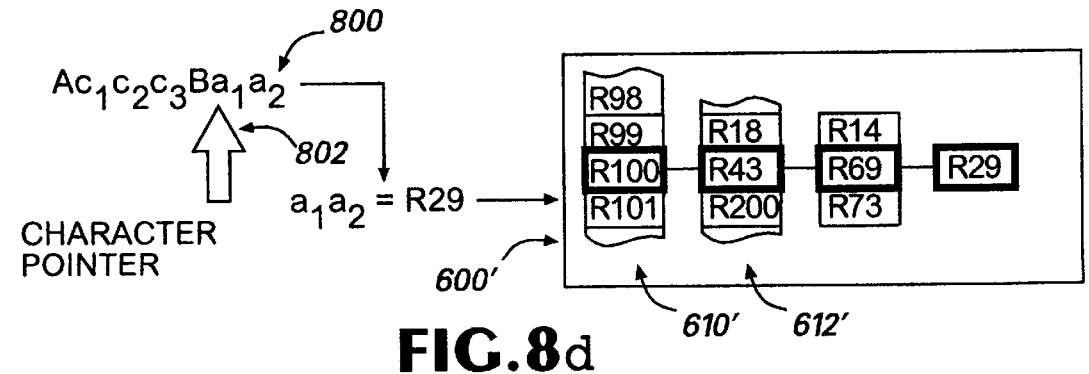
FIG. 8d
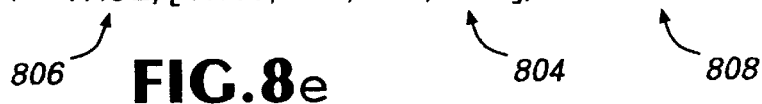
FIG. 8e

CONSISTENCY CHECKER FOR DOCUMENTS CONTAINING JAPANESE TEXT

TECHNICAL FIELD

The present invention relates generally to word processing systems and more particularly to the identification of inconsistently spelled words within a document that contains Japanese text.

BACKGROUND OF THE INVENTION

Computer users are accustomed to using "checking" program modules (e.g., spell checkers, grammar checkers, and consistency checkers) for alerting users to words within a document that are questionable based on some predefined set of rules. For example, if a word is found in a document, but is not found in a spell checker's dictionary, then the word can be marked to indicate that it is questionable. Similarly, if a correctly spelled word is found in the spell checker's dictionary, but its spelling is inconsistent with other variants of the word in the same document (e.g., color and colour), then the lesser-used variant (or all of the variants) might be marked as questionable.

Japanese language consistency checkers are typically more complex than English language consistency checkers because Japanese consistency checkers must accommodate multiple acceptable spelling variants of a particular word. Typically, a document of Japanese text employs more than one writing system, with each system having a unique character set. The most commonly used Japanese writing systems are Kanji, Hiragana, and Katakana. Kanji is a writing system composed of pictographic characters, mostly derived from Chinese writing systems. Hiragana is a writing system that is phonetic in nature and shares no common characters with Kanji. Katakana is another phonetic writing system that is primarily used for writing words borrowed from Western languages, and also shares no common characters with Kanji. Kanji pictographs are analogous to shorthand variants of Hiragana words in that any Kanji word can be written in Hiragana, though the converse is not true. A single Japanese word can include characters from more than one writing system. For example, a correctly spelled word may be written using two Kanji characters, one Kanji character followed by two Hiragana characters, or by four Hiragana characters. In short, the challenge presented to consistency checking programs by documents containing Japanese text is that a variety of words can be acceptable variants of one another. Therefore, a Japanese word consistency checker must be complex in order to accommodate all acceptable variants.

A problem with currently available Japanese consistency checkers is that they do not provide a sufficient means for generating all of the common Japanese spelling variants. Because a document employing more than one Japanese writing system may include many acceptable word variants, the user may desire to be prompted when a word has been spelled inconsistently with other occurrences of the same word variant. That is, when one variant is different from others in the same document. Currently available Japanese consistency checkers utilize manual variant generation, thereby incurring the risk of overlooking common spelling variants.

Accordingly, there is a need for a Japanese language consistency checker that is capable of providing a method for identifying and generating substantially all acceptable spelling variants of a particular Japanese word. The Japanese language consistency checker should also be capable of identifying spelling variants that are used inconsistently with other spelling variants in the same document. The consistency checker should also be capable of maintaining statistics of spelling variant uses within a particular document, thereby enabling the consistency checker to identify lesser-used variants.

SUMMARY OF THE INVENTION

The present invention satisfies the above-described needs by providing an improved method for generating common Japanese spelling variants and for checking for inconsistent spellings among words in a document containing Japanese text. The present invention provides a method for breaking a word down into reading units, which are similar to syllables, and associating the reading units with reading pairs, which identify acceptable variants of the reading unit. By accessing a Reading Pair Database (RPD), the reading units of a particular word can be represented by Reading Pair Identification Numbers (RIDs). By representing the words within a document as RID arrays, the words can be mapped onto a Condensed Lexicon Database (CLD) in order to verify the RID array and generate a Sense Identification Number (SID). The SID provides a means by which spelling variants can be normalized. Normalization is accomplished by assigning all words that are spelling variants of one another the same SID. Inconsistent words are those words that belong to the same SID set (i.e., have the same SID), but have different spellings from other words in the SID set. These inconsistently spelled words are assigned Spelling Variant Identification Numbers (SVIDs) that are unique within the SID set.

The reverse process is utilized for the generation of Japanese spelling variants. Specifically, after a word is parsed into a RID array, all of that word's spelling variants can be generated by varying each reading unit in the RID array. The generation process provides a complete list of spelling variants which can be compiled into the CLD, for subsequent use in identifying inconsistent occurrences (i.e., spelling variants) of the same words. Because all of the generated spelling variants are assigned the same SID, the identification process is significantly simplified. Statistics are maintained on the existence and number of occurrences of spelling variants within a document by incrementing count values corresponding to each SVID.

In one aspect of the invention, a method is provided for checking the consistency of a plurality of words contained in a word list. By isolating reading units within each word, assigning each reading unit a RID (by reference to the RPD) and reforming each word as a RID array, the word can be mapped onto the CLD. Successfully mapping a word (in RID array form) onto the CLD generates the SID that is assigned to the word and permits the normalization of all words having the same SID. Normalization is further enhanced by assigning an SVID to each word, which identifies a particular spelling of each spelling variant having the same SID. A Reply Message is generated, reporting the success or failure of the attempt to map the word onto the CLD.

In another aspect of the invention, a data structure containing the RPD is provided. The RPD data structure contains three types of data. The first type of data is a plurality of RIDs. Each RID identifying a pair of reading units. The second type of data is the set of Kanji reading units constituting the reading pairs. The third type of data is the set of Hiragana reading units constituting the reading pairs. Each RID corresponds to a Kanji reading unit and a Hiragana reading unit, which as equivalent to each other.

In yet another aspect of the invention, a method of creating the RPD is provided. By comparing lists of Japanese words, reading units from various character sets can be isolated and associated with equivalent reading units from other character sets. The associated reading units can be stored as reading pairs and assigned a RID. A multi-pass approach to generating the reading pairs and associated RIDs permits the elimination of errant or low-occurrence reading pairs, in favor of well-established and high-occurrence reading pairs.

The various aspects of the present invention may be more clearly understood and appreciated from a review of the following detailed description of the disclosed embodiments and by reference to the appended drawings.

BRIEF DESCRIPTION OF THE DRAWINGS

FIG. 8, consisting of FIGS. 8a–8e, is a pictorial representation of an exemplary method of processing a word by the Mapping Procedure employed in an embodiment of the present invention.

DETAILED DESCRIPTION

Figure 1:
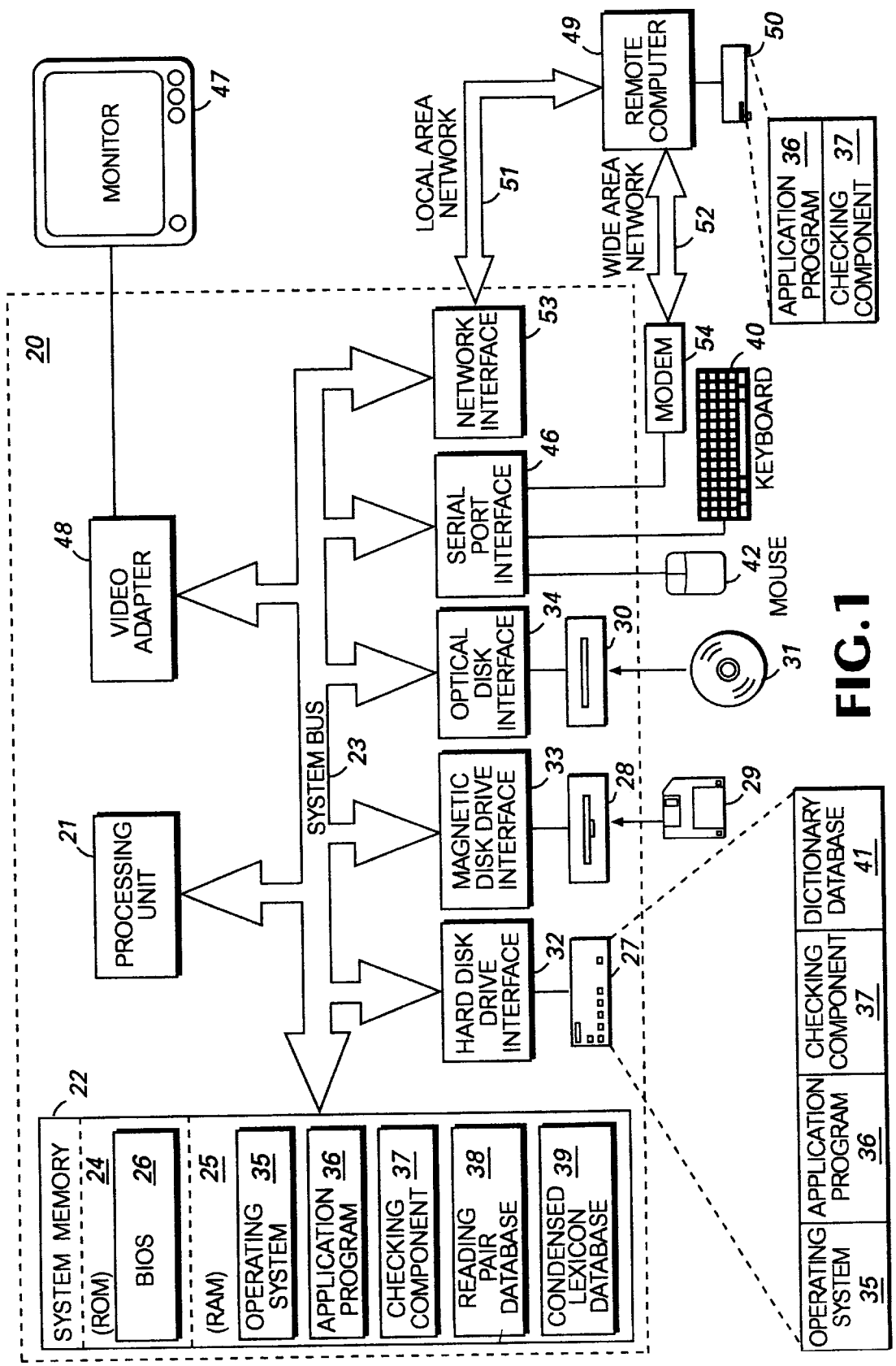
FIG. 1 is a block diagram of a personal computer that provides the operating environment for an embodiment of the present invention.

The present invention is directed to a method and a data structure for checking the consistency of the spelling of Japanese words within a document. The present invention may be implemented as a consistency checker or checking component that is employed in conjunction with a word processing program capable of handling Japanese text. In an exemplary embodiment, the checking component is embodied in a dynamic-link library (DLL) that is used in conjunction with the "MICROSOFT WORD" word processing application program, which is published by the Microsoft Corporation of Redmond, Wash. Alternatively, the checking component may be embodied directly in the word processing application program. In either configuration, the word processing program allows a user to generate documents including Japanese text. The checking component provides a means for determining whether the words contained in that document have been spelled consistently with one another, where more than one spelling of a particular word is acceptable.

Japanese language consistency checking must accommodate multiple acceptable spelling variants of a particular word. Typically, a document of Japanese text employs more than one writing system, with each system having unique character sets. The most commonly used Japanese writing systems are Kanji and Hiragana. Kanji is a writing system composed of pictographic characters, mostly derived from Chinese writing systems. Hiragana is a writing system that is phonetic in nature and shares no common characters with Kanji. Kanji pictographs are analogous to shorthand variants of Hiragana words in that any Kanji word can be written in Hiragana, though the converse is not true. A single Japanese word can include characters from more than one writing system. For example, a correctly spelled word may be written using two Kanji characters, one Kanji character followed by two Hiragana characters, or by four Hiragana characters. In short, the challenge presented to consistency checking programs by documents containing Japanese text is that a variety of words can be acceptable variants of one another. The present invention provides an improved method for the consistency checking of Japanese text documents.

Through the use of a Reading Pair Database (RPD) and a Condensed Lexicon Database (CLD), an embodiment of the present invention analyzes Japanese text to detect inconsistencies. A word processing program (or other application program) calls a Checking Component to check for inconsistencies within a Japanese text document. The Checking Component, in turn, calls a Word Breaking Component to break the sentence into words in a word list. The Checking Component then analyzes each word, and assigns a Sense Identification Number (SID) and a Spelling Variant Identification Number (SVID) to each word.

Words that are acceptable spelling variants of one another share the same SID, despite having different spellings. The Checking Component maintains a Registry that maintains word occurrence statistics to determine when spelling variants with the same SID exist within a particular document. When spelling variants do exist, the Checking Component will so indicate in an "error" data field within the Registry. The word processing program can be configured to monitor the error data field in the Registry to be alerted to the existence of spelling variants within a document.

An Exemplary Operating Environment

FIG. 1 and the following discussion are intended to provide a brief, general description of a suitable computing environment in which the invention may be implemented. While the invention will be described in the general context of an application program and dynamic-link library (DLL) that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules and data files may be stored in the drives and RAM 25, including an operating system 35, one or more application programs 36, a checking component 37, a Reading Pair Database (RPD) 38, and a Condensed Lexicon Database (CLD) 39. The RPD 38 and the CLD 39 may be stored together as a Dictionary Database 41 on the hard disk drive 27. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Interaction Between the Checking Component and the Application Program

Figure 2:
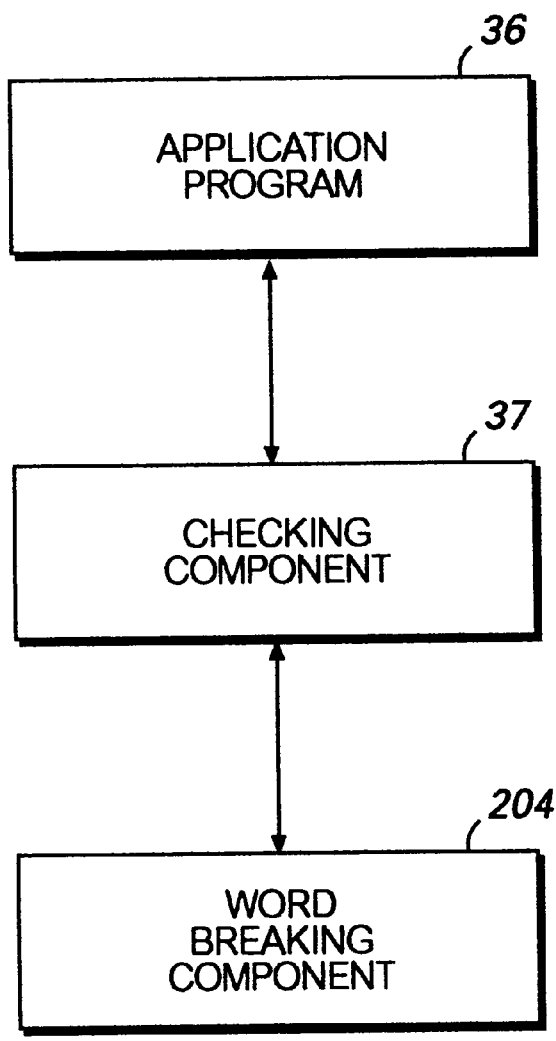
FIG. 2 is a block diagram illustrating the interaction between the major program modules employed in an embodiment of the present invention.

The Checking Component 37 can be implemented as a dynamic-link library (DLL). FIG. 2 depicts a block diagram illustrating the interaction between the major program modules employed in an embodiment of the present invention. Generally stated, a DLL is an executable routine, stored as an independent file, that can be loaded on an as-needed basis by program modules that "call" the DLL. An application program 36 can call a DLL to perform a specific function, thereby eliminating the need for the application program 36 to provide the function itself. For example, the "MICROSOFT WORD" application program (or another application program) can call the Checking Component 37 when consistency checking is required. Similarly, one DLL can call another DLL to perform other functions. For example, after the Checking Component 37 has been called by the "MICROSOFT WORD" application program, the Checking Component 37 can call a Word Breaking Component 204 which is, itself, a DLL.

A call to a DLL often passes some information to the DLL that the DLL uses to perform its specified function. For example, the "MICROSOFT WORD" application program may pass a group of words in a call to the Checking Component 37 for consistency checking. Because words in Japanese text are often written without any separation between the words, the Checking Component 37 may need for the text to be broken down into words before the Checking Component 37 can perform its checking function. The Word Breaking Component 204 can provide this functionality. A call from the Checking Component 37 can pass the string of words to the Word Breaking Component 204, which may break the string into individual words, which can be handled by the Checking Component 37. The individual words can then be sent back to the Checking Component 37 for consistency checking.

Once the words have been checked for inconsistencies, the Checking Component 37 can return a Reply Message to the "MICROSOFT WORD" application program informing it of the status of the words in the string. The details of the Reply Message will be discussed in more detail in connection with FIG. 8. The two-way arrows depicted in FIG. 2 indicate the ability of each of the DLL modules of an exemplary embodiment of the present invention to make and accept calls and to return information to the calling module or program. In this embodiment, the calling program can be the Checking Component 37 or the "MICROSOFT WORD" application program.

Figure 3:
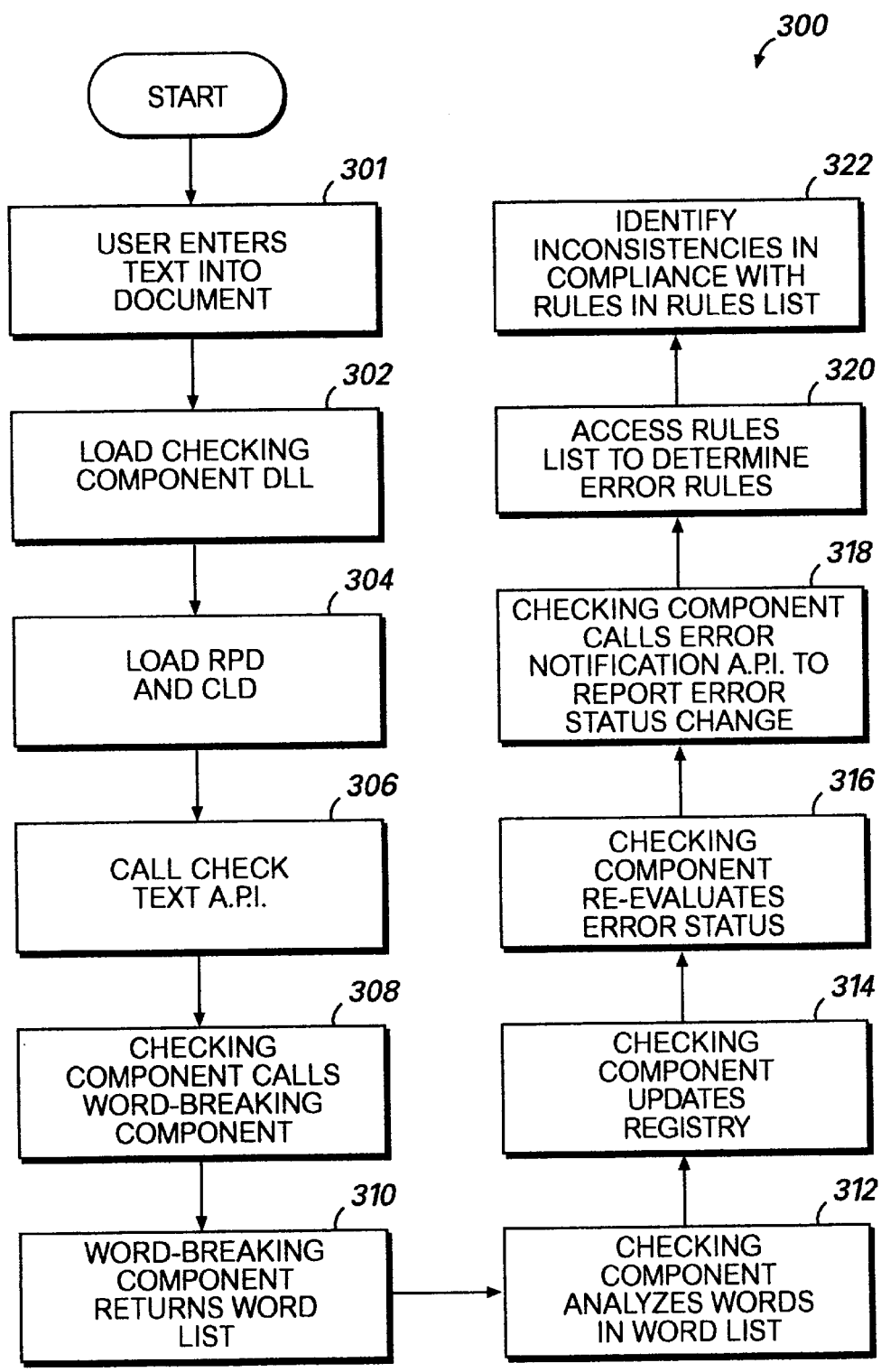
FIG. 3 is a flowchart illustrating the method of operation of the Checking Component in an embodiment of the present invention.

FIG. 3 depicts a flowchart illustrating an exemplary method 300 for using a DLL (the Checking Component 37) to provide consistency checking in conjunction with the "MICROSOFT WORD" word processing application program. The "MICROSOFT WORD" application program will also be referred to as the "calling program" in this context, because it is capable of calling the Checking Component 37 DLL.

In an exemplary embodiment, the method 300 begins at step 301 when Japanese text is entered into a word processing document. The method 300 then proceeds to step 302, in which the "MICROSOFT WORD" word processing application program loads the Checking Component 37 DLL (FIG. 1). The method 300 then proceeds to step 304, in which the RPD 38 (FIG. 1) and the CLD 39 (FIG. 1) and other resources are loaded by the Checking Component 37. At this point, the Checking Component 37 DLL is loaded along with all of the tools needed to check the Japanese text contained in a document for inconsistencies.

The method 300 then proceeds to step 306 in which the word processing program calls the Checking Component 37 to analyze the text within the document. As described above, the call will pass the text containing the words to the Checking Component 37 DLL. One way of accomplishing this is by use of an Application Programming Interface (API). As is well known to those skilled in the computer arts, an API is an interface that allows one program module to utilize functions that are implemented in and defined by a second program module. Thus, by calling a Check Text API, the word processing program can initiate the checking functions of the Checking Component 37 and provide the words that should be checked. The word processing program can be configured to call the Checking Component 37 at particular intervals during the generation of the document. For example, an appropriate frequency for analyzing entered text might be every time the user has completed entering a sentence.

Once a sentence has been passed to the Checking Component 37, the Checking Component 37 can call other DLLs in order to effect certain operations. One such operation might be to break the sentence into its constituent words. In an exemplary embodiment, the Checking Component 37 examines a list of individual words that is provided by the Word Breaking Component 204. The nature of Japanese text is such that the words within a sentence are not normally separated by a space character or any other delimiter. A Word-Breaking Component 204 may provide this operation. Such a word breaking component is disclosed in a copending U.S. patent application Ser. No. 08/672,638, entitled "Identification of Words in Japanese Text by a Computer System", filed Jun. 28, 1996 and assigned to Microsoft Corporation. The disclosure of this copending application is incorporated herein by reference.

If the word processing program is configured to check consistency on a per sentence basis, then the output from the Word-Breaking Component 204 (FIG. 2) will be a word list containing all of the words in the most recently generated sentence, with each word separated from adjacent words by a suitable delimiter. Referring still to FIG. 3, the Checking Component 37 (FIG. 2) calls the Word Breaking Component 204 (FIG. 2) at step 308 and passes the sentence to the Word Breaking Component 204. At step 310, the Word Breaking Component 204 (FIG. 2) returns a word list to the Checking Component 37, which analyzes each word individually at step 312. The method 300 then proceeds to step 314 at which the Checking Component 37 updates a Registry that is used to maintain statistics on the words in the document. The analysis step 312 and update step 314 will be described in more detail below, in connection with FIGS. 4–10.

At step 316, the Checking Component 37 (FIG. 2) reevaluates the error status. Where the update to the Registry (step 314) results in a change in the error status, the word processing program must be informed of the change in order to provide accurate error messages to the user. Error status will be discussed in more detail below, but generally, the presence or absence of inconsistencies in a document will affect the error status. A change in error status must be reported to the word processing program. This is accomplished, at step 318, by the Checking Component 37 calling an error notification API thereby implementing a reporting routine within the word processing program to report the error status change.

The method 300 then proceeds to step 320, at which the word processing program accesses a Rules List to determine whether the error is to be reported to the user. A user of the word processing program can decide whether inconsistencies among words in a document should be reported. Likewise, the user may decide that only kanji-hiragana variants or only okurigana variants should be identified as inconsistent within the document. Such rules may be selected by the user and stored in the Rules List. By accessing the Rules List, the word processing program determines how the error status output of the Checking Component 37 (FIG. 1) will be used. In the final step of the method 300, step 322, the word processing program identifies inconsistent variants in the document in a manner conforming to the Rules List. Notably, if no inconsistencies exist in a document, there will be no need for the word processing program to access the Rules List for the purposes of inconsistency reporting. A common way to identify a particular word and/or mark a particular word as questionable (e.g., report an inconsistent variant) in the word processing program is to highlight or underline the word within the document.

This series of steps is repeated as frequently as the word processing program is configured to check the text for inconsistencies. While the above description has been directed to the processing of inconsistency error messages in conjunction with the "MICROSOFT WORD" word processing application program, it should be appreciated that the invention can be used in conjunction with a variety of application programs capable of generating documents or files containing Japanese text.

The Reading Unit and the Reading Pair

The present invention takes advantage of the fact that the Japanese written language can be represented as a set of reading units. Reading units are the written (i.e., text) representations of the same syllable in Japanese spoken language. Because there are at least two different character sets (Kanji and Hiragana) that are commonly found in Japanese text documents, reading units provide a means for correlating characters or groups of characters from each of the character sets that can represent the same syllable. Equivalent reading units (from different character sets) can be matched and combined to form a reading pair. A reading pair can represent, for example, a Kanji character and one or more Hiragana characters that are acceptable alternatives in one or more Japanese words.

Figure 4:
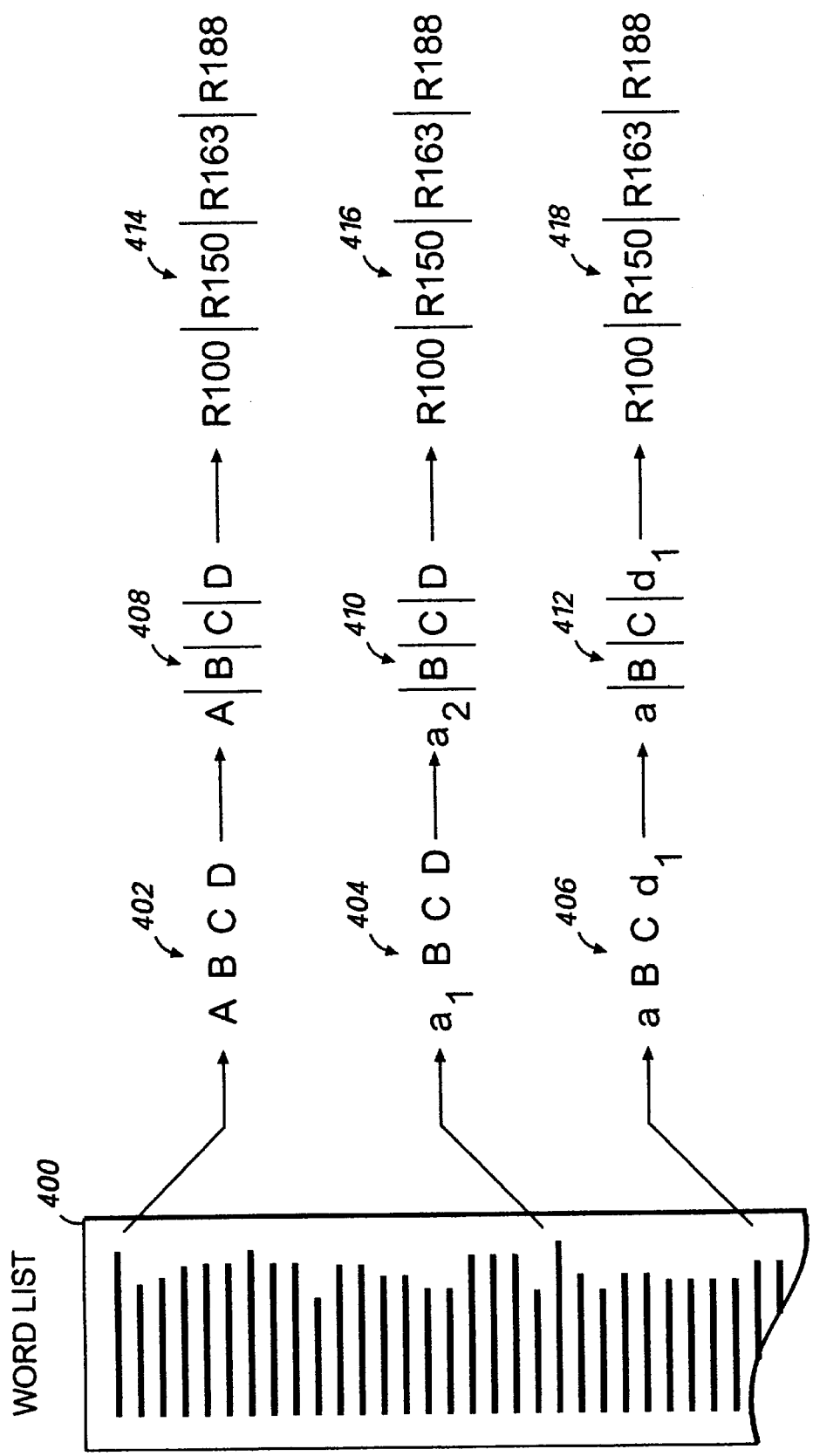
FIG. 4 is a pictorial representation of an exemplary set of spelling variants and their constituent parts that have been broken down into RID arrays by an embodiment of the present invention.

Referring now to FIG. 4, an exemplary word list 400 containing words of Japanese text is depicted. The word list 400 is the output of the Word Breaking Component 204. The Word Breaking Component returns the word list 400 in response to the receipt of a sentence in a call from the Checking Component 37. Each word in the word list 400 is composed of one or more reading units, which are analogous to an English language syllable. In this example, a Kanji reading unit is represented by an uppercase English character (e.g., "A") and a Hiragana reading unit is represented as a lowercase English character (e.g., "$a_1$"). The lowercase English character representation of a Hiragana reading unit is augmented with a subscript number to indicate that more than one Hiragana reading units can be an equivalent of a Kanji reading unit. FIG. 4 graphically depicts the general steps in a process used to break-down word variants 402, 404, and 406 contained in the word list 400 into Reading Pair Identification Number (RID) arrays 414, 416, and 418. Generally stated, a RID array is a list of RIDs, which each identify a reading pair (i.e., a Kanji reading unit and its Hiragana equivalent reading unit). The RIDs and Reading Pairs are stored together in a database, the details of which will be provided below.

Each word variant 402, 404, 406 extracted from the word list 400 in FIG. 4 represents a Japanese word that includes both Kanji and Hiragana reading units. Words 402, 404, and 406 are spelling variants of one another. That is, they are words with identical meanings and pronunciations, but non-identical spellings. Specifically, "A" is a Kanji equivalent to the Hiragana reading unit "$a_1$" and Hiragana reading unit "$a_2$" (not shown). The pair "A","$a_1$" comprise a reading pair and the pair "A","$a_2$" comprise another reading pair. A reading pair is a set of two reading units from different character sets that can function as alternative equivalents in at least one Japanese word.

Each word can be represented as a series of reading units that can be isolated into a reading unit array 408, 410, and 412. Once the reading units have been isolated, they can be represented by RIDs, which are simply unique identifiers associated with each distinct reading pair. As will be discussed below, in connection with FIG. 5, reading pairs are assigned RIDs in order to allow the reading pairs to be more readily processed within the data structures of an exemplary embodiment of the present invention. The collection of the RIDs is referred to as a RID array 414, 416, and 418. As depicted in FIG. 4, the RID array 414, 416, and 418 for each of the word variants is the same. That is, even though words "ABCD", "$a_1$BCD", and "$a_2$BCd$_1$" have non-identical spellings, they are represented by the same RID array, "R100; R150; R163; R188". Thus, spelling variants are normalized, to the extent that non-identical words with identical RID arrays are recognizable as spelling variants of one another. Non-identical words with the same RID array are identifiable as inconsistent, whereas words with the same RID array and identical spellings are identifiable as consistent.

Generating Reading Pairs and RIDs

As discussed above, one of the components of an exemplary embodiment of the present invention is the reading pair. The reading pairs can be generated and assigned a RID by means of a multi-pass algorithm for analyzing all acceptable Japanese words and their acceptable variants. Because each RID represents a reading pair, which represents a pair of equivalent reading units, the RID generation process depends on finding all common reading units in the Japanese language. An algorithm has been developed for automatic reading unit differentiation.

The input to the algorithm is a first list of Japanese words with their common spelling (usually a mixture of Kanji and Hiragana reading units) and a second list of Japanese words with the Hiragana-only equivalents to the Kanji/Hiragana word list. The algorithm applies a multi-pass approach to discover reading units and to enhance the confidence that a discovered potential reading unit is indeed an actual reading unit. Once the reading units in the Kanji/Hiragana words have been differentiated, they can be paired to the differentiated reading units of the equivalent Hiragana-only words to create a reading pair.

Japanese text containing Kanji and Hiragana characters is commonly written with yet another character set, Okurigana. Often, Okurigana characters are used to (among other things) divide a Japanese word into its constituent reading units (i.e., to act as reading unit boundaries). Thus, they provide a good starting point for the reading unit differentiation algorithm. The first pass of the algorithm extracts and stores all possible reading units by identifying the Okurigana characters and by using the Okurigana characters as reading unit boundaries.

On the first pass over the word lists and all subsequent passes, all extracted reading units are associated with a discovery count. The discovery count is established when the reading unit is first discovered (extracted) and is incremented whenever the reading unit is re-discovered. Each Hiragana reading unit discovered in the second word list is associated with a Kanji reading unit discovered in the first word list. The discovery count, for a particular Hiragana reading unit, can be converted to a frequency count. The frequency count is the discovery count of that Hiragana reading unit divided by the sum of all discovery counts for Hiragana reading units associated with the same Kanji character. The frequency count can be compared to some predefined threshold in order to eliminate low-frequency reading units. If a reading unit has a frequency lower than the threshold, then an assumption is made that the reading unit has been differentiated erroneously and does not actually represent a valid Hiragana reading unit. At the end of each pass of the word lists, reading unit frequency counts can be re-evaluated (e.g., raising the threshold to be more restrictive of new reading units).

On subsequent passes through the word lists, the algorithm identifies the optimal combinations of reading units that generate words. When multiple combinations of reading units exist for a particular word, the optimal combination (of reading units) is determined by examining the product of the frequency counts of the constituent reading units. By multiplying the frequency counts of the constituent reading units of a word, the combination of reading units with the highest frequency count product can be identified as the optimal combination. The discovery counts of the constituent reading units of an optimal combination are incremented to further distinguish these reading units from reading units that are constituents of sub-optimal combinations. This algorithm can be run multiple times to achieve a practical trade-off of the following criteria: a) the pool of reading units capable of generating the most words in the word lists (i.e., precision); and b) the number of reading units in the pool are sufficiently small (i.e., size).

In an alternative embodiment of the present invention, a Dictionary can be created by the above method. By generating and storing a list of all spelling variants for each of the words in the first list (i.e., the word list containing the words of mixed Kanji and Hiragana reading units), a Dictionary can be created, thereby providing a simple look-up table means of checking the consistency of words in a Japanese text document. Instead of loading the RPD and the CLD for checking consistency (as discussed in connection with FIG. 3), the Dictionary can be loaded and the words in the document simply compared to the entries of the Dictionary.

Specifically, the Dictionary can be generated by first applying the reading pair discovery algorithm described above. Once the reading pairs have been discovered, then every word in the word list can be assigned a RID array. Once a RID array has been determined, all of the Hiragana alternatives of each reading unit in the word can be substituted in the word, thereby generating a spelling variant. All of these generated spelling variants can be stored in the Dictionary and assigned an SVID for subsequent comparison.

The Reading Pair Database

Figure 5:
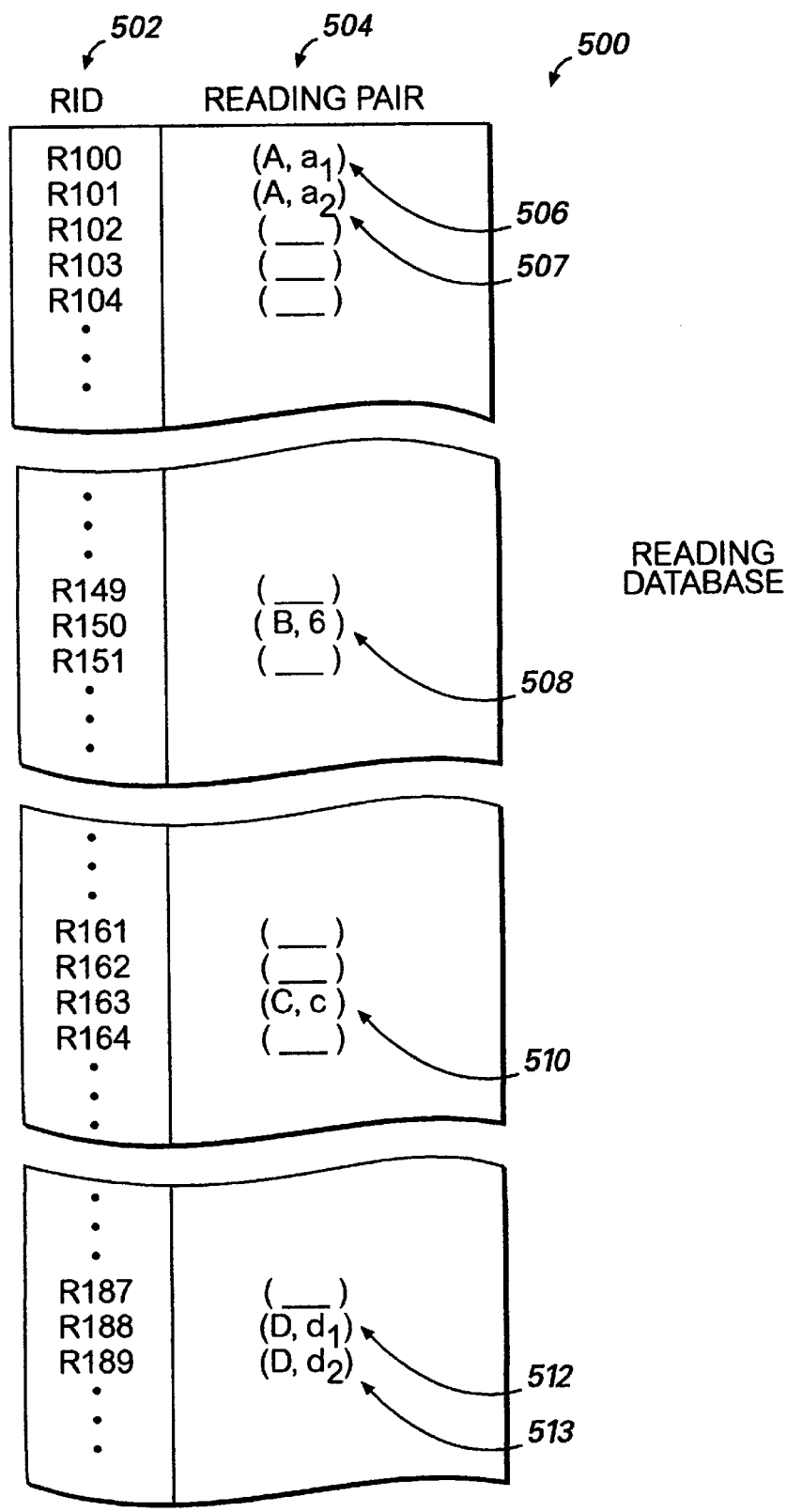
FIG. 5 is a pictorial representation of portions of the Reading Pair Database employed in an embodiment of the present invention.

Once the reading units have been discovered, they can be cataloged for subsequent use. FIG. 5 depicts an excerpt from an exemplary Reading Pair Database (RPD) that performs this cataloging function. As described above, the reading units are generated by comparing words that are known equivalents. Consequently, after the Hiragana reading units have been differentiated, they will also be associated with a Kanji reading unit. This pair is referred to as the reading pair.

In an exemplary embodiment of the present invention, the reading pairs can be organized into an RPD 500. Reading Pair Identification Numbers (RIDs) are listed in RID data fields 502 and are associated with reading pairs listed in reading pair data fields 504. By searching the reading pair data fields 504 in the RPD, the present invention can determine the RID corresponding to a particular reading unit. Thus, a known Hiragana reading unit can be associated with an RID that also corresponds to a Kanji reading unit.

An example of the cross-referencing enabled by the RPD 500 is depicted in FIG. 5. Returning to the first of the word variants ("ABCD") discussed in connection with FIG. 4, the first reading unit, "A" is a Kanji reading unit. In order to determine the spelling variants, the present invention can do a search on the reading pair column 504 of the RPD 500 to find the reading pair containing "A". Reading pairs 506 and 507 satisfy this criterion. Therefore, based solely on the fact that fact that the word contains the reading unit "A", an initial assumption can be made that "$a_1$" and "$a_2$" are two Hiragana reading units that correspond to reading unit "A". This will be discussed in more detail in connection with FIGS. 6 and 7.

Referring now to the RID arrays 414, 416, 418 of FIG. 4 and considering them in the context of the RPD 500 of FIG. 5, the following table depicts all of the reading unit combinations that may be represented by the RID array R100; R150; R163; R188:

TABLE 1

| Spelling Variant | RID Array |
| --- | --- |
| ABCD | R100; R150; R163; R188 |
| ABCd$_1$ | R100; R150; R163; R188 |
| ABcD | R100; R150; R163; R188 |
| ABcd$_1$ | R100; R150; R163; R188 |
| AbCD | R100; R150; R163; R188 |
| AbCd$_1$ | R100; R150; R163; R188 |
| AbcD | R100; R150; R163; R188 |
| Abcd$_1$ | R100; R150; R163; R188 |
| a$_1$BCD | R100; R150; R163; R188 |
| a$_1$BCd$_1$ | R100; R150; R163; R188 |
| a$_1$BcD | R100; R150; R163; R188 |
| a$_1$Bcd$_1$ | R100; R150; R163; R188 |
| a$_1$bCD | R100; R150; R163; R188 |
| a$_1$bCd$_1$ | R100; R150; R163; R188 |
| a$_1$bcD | R100; R150; R163; R188 |
| a$_1$bcd$_1$ | R100; R150; R163; R188 |

As mentioned above, these possibilities exist only in the abstract. That is, although this RID array can represent 16 possible word variants, the rules of the Japanese language must be applied to determine which of the possible spelling variants are acceptable spelling variants. This is done by the use of the Condensed Lexicon Database.

The Condensed Lexicon Database

Figure 6:
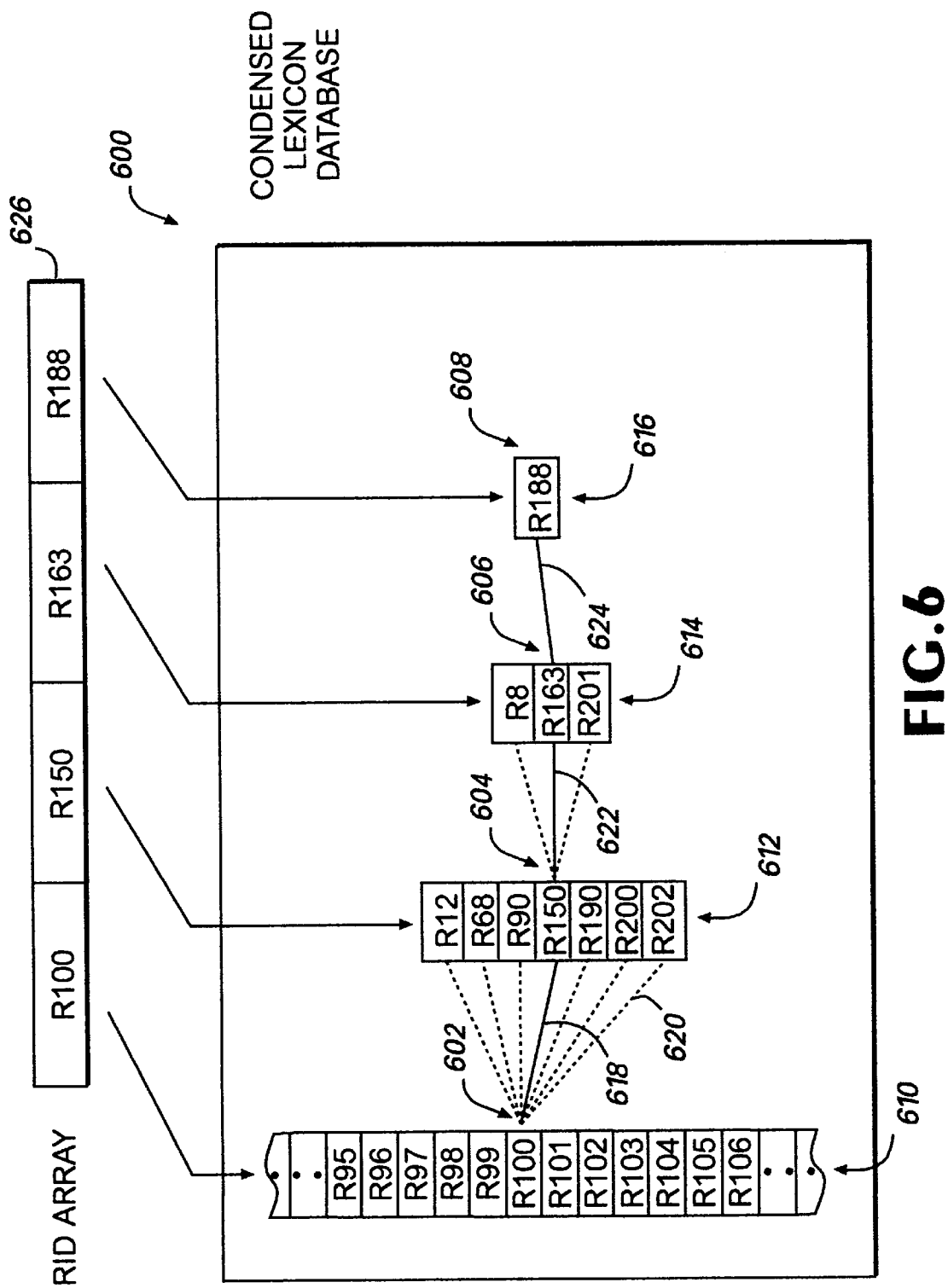
FIG. 6 is a pictorial representation of portions of the Compressed Lexicon Database employed in an embodiment of the present invention.

An exemplary embodiment of the Condensed Lexicon Database (CLD) 600 is depicted in FIG. 6. The present invention utilizes the CLD 600 to "map" a RID array, thereby verifying the veracity of the RID array. The veracity of the RID array is verified in two ways. First, the RID array is verified to represent a valid Japanese word. Second, the RID array is recursively generated by reference to the CLD 600 and to the RPD 500. The details of these verification procedures are provided in connection with the discussion of FIG. 8. The structure of the CLD will now be described in order to lay a foundation for understanding that discussion.

The CLD is a data tree structure (e.g., a Directed Acyclic Word Graph or DAWG), comprising a plurality of nodes 602, 604, 606, 608, containing RIDs and organized into states 610, 612, 614, 616. The nodes within one state are connected to the nodes within the adjacent state by downpointers 618, 620, 622, 624. The first state in the CLD is referred to as the root state 610 and contains all of the RIDs representing first reading units in any acceptable Japanese word (i.e., any word recognizable by the Checking Component 37). Referring again to the word used as an example in FIGS. 4 and 5 and represented by the RID array 626, FIG. 6 illustrates how the word can be mapped onto the CLD.

The root state 610 is searched for RID R100 which is found in node 602 and has downpointers 618, 620 to nodes in the second state 612. Node 604 in the second state 612 contains RID R150, which corresponds to the second reading unit in the word. Likewise, node 604 has a downpointer to node 606 which contains RID R163 and is located in the third state 614. Finally, node 606 has a downpointer to node 608 which contains RID R188 and is located in the fourth state 616. Because node 608 represents the last RID in this word, it is referred to as the terminal node for this particular word.

A path can be drawn between node 602 in the root state and the terminal node, node 608. This path represents all of the possible spelling variants that can be represented by this RID array 626. This path is unique to this RID array 626, and the RID array 626 cannot be mapped onto the CLD 600 by traversing the CLD along any other path. Because of the uniqueness of the path, a Sense Identification Number (SID) can be assigned to the path, thereby representing all words that can be represented by the RID array. By associating index numbers with each node in the CLD and totaling the index numbers as the path is traversed, a unique SID can be assigned to each unique path in the CLD. As will be discussed in more detail in connection with FIG. 8, this one-to-one relationship provides a means for normalizing a word into its spelling variant group.

As depicted in FIG. 6, RID R100 represents a reading unit that can be the first reading unit in at least seven words, because it has seven downpointers pointing to the second state. Once the second RID, RID R150, of the word has been determined, the number of potential acceptable words, that can be represented by the RID array starting with RID R100 and RID R150, is reduced to three, because only three downpointers connect the R100/R150 RID combination to subsequent states. Once the third RID R163 has been determined, only one possibility exists for the four-reading unit word; i.e., that node 608 containing RID R188 will represent the last reading unit in the word.

As discussed in connection with FIG. 5, a Kanji reading unit can be represented by more than one reading pair and RID, although in the context of a particular word, it can only be represented by a particular reading pair and RID. However, potentially representative RIDs can be eliminated as possibilities through the use of the CLD. For example, where a second RID in a particular reading array is known (i.e., only one RID satisfies the criteria defining the RID), any potential first RIDs without downpointers connecting the potential first RID to the known second RID can be eliminated as possibilities. This aspect of the CLD provides a means by which the present invention can normalize spelling variants with accuracy. A more detailed description of this process is provided in connection with the description of FIG. 8.

The Spelling Variant Identification Registry

Figure 7:
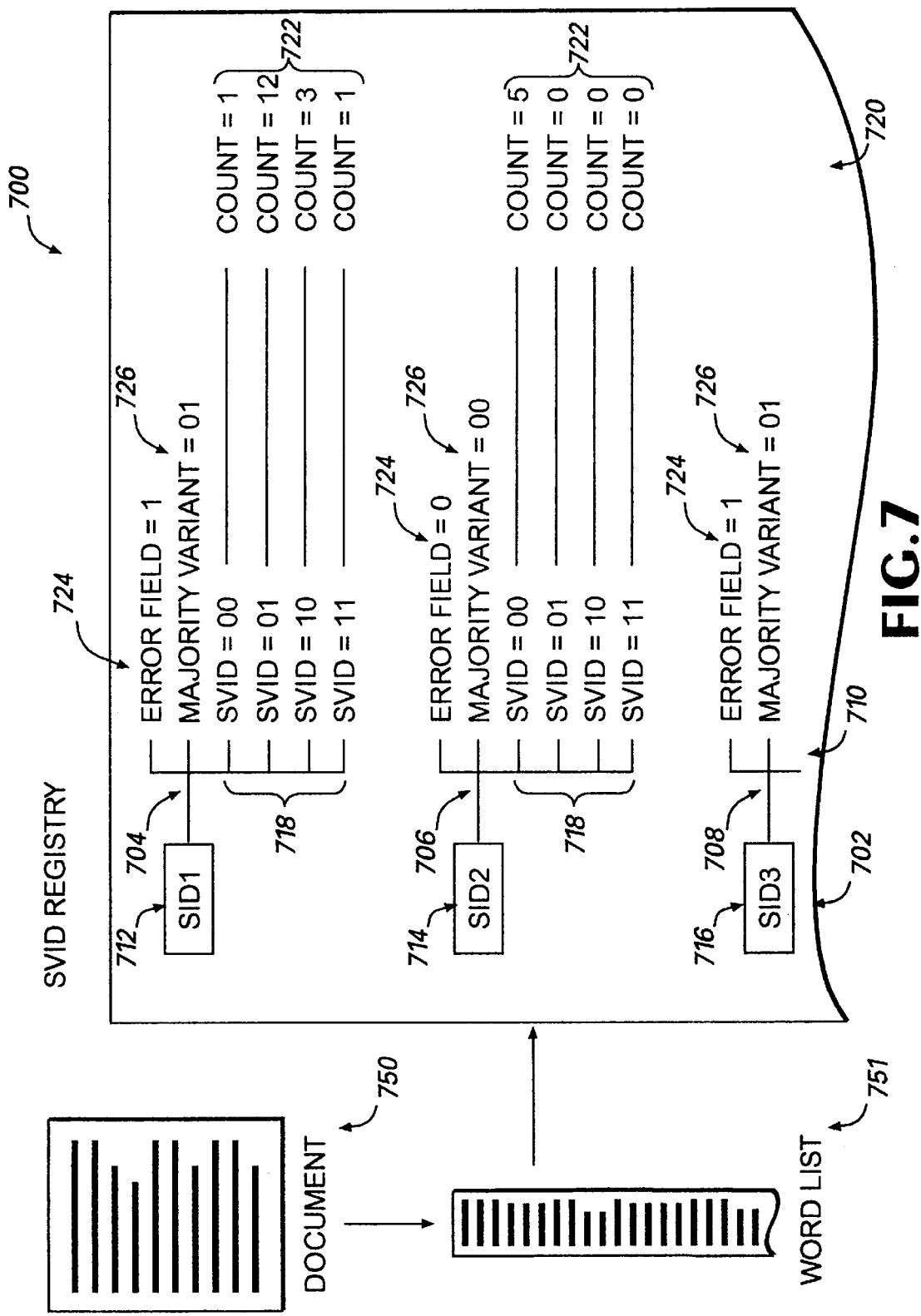
FIG. 7 is a pictorial representation of portions of a Registry employed in an embodiment of the present invention.

Referring now to FIG. 7, an exemplary Spelling Variant Identification Registry ("Registry") 700 is depicted as having a data tree structure. In an exemplary embodiment of the present invention, the Registry 700 is used to maintain statistics on the words within a word list 751 that contains the individual words of a document 750. By maintaining statistics on words within the word list 751, the present invention can determine the existence of inconsistent spelling variants within the document 750 without having to re-analyze the document 750 every time a new word is added.

The data tree of the Registry has a root state 702, which has downpointers 704, 706, 708 that point to nodes within a second state 710. The root state 702 contains root nodes 712, 714, 716 with SID values stored therein. Each SID value in the root nodes represents a particular RID array corresponding to a word that has been discovered at least once in the word list and has been successfully mapped onto the CLD. The correlation between a particular word and its representative SID is described above, in connection with FIG. 6. Thus, each SID value in a root node 712, 714, 716 of the Registry 700 represents the set of all of the words that are acceptable spelling variants of one another. When a new word is discovered within a document and a new RID array and new SID are determined, a new node is created in the root state 702 to maintain statistics on the new SID.

The second state 710 maintains a Spelling Variant Identification Number (SVID) 718 for each acceptable spelling variant corresponding to the SID contained in the root state 702. Each non-identical spelling variant is assigned a unique SVID 718. An exemplary means of assigning SVIDs 718 is to represent a spelling variant's spelling units as a sequence of binary values forming a binary "word". Thus, a four-reading-unit-long spelling variant having a Kanji, Hiragana, Kanji, Hiragana sequence of reading units could be represented by the binary word "1010", where a binary one value represents a Kanji character and a binary zero value represents a Hiragana character. Of course any means of generating a SVID that uniquely identifies variants with the same SID is sufficient for the purposes of an exemplary embodiment of the present invention. Indeed, the actual implementation may generate SVIDs in an arbitrary fashion during the generation process described above.

The third state 720 contains Count nodes 722 that maintain the number of occurrences of each spelling variant. Each time a particular spelling variant is discovered in the word list 751, the Count value in the Count node 722 corresponding to the SID of that spelling variant is incremented. When a document has been completely analyzed, all recognizable words will have been counted.

Returning to the second state 710, the Registry 700 also maintains an error field node 724 and a majority variant node 726. The error field node 724 indicates whether more than one spelling variant, corresponding to a particular SID, has been discovered within the word list 751. The majority variant node 726 maintains the SVID 718 of the spelling variant, corresponding to a particular SID, that occurs the most times within the word list 751.

The majority variant node 726 maintains the highest-occurring SVID 718 by determining which SVID 718 corresponds to the Count node 722 containing the highest occurrence value. The majority variant data field can be updated every time that the Count value in the Count node 722, corresponding to a particular SID, is incremented. Thus, the SVID 718 representing the word variant that occurs most commonly in the word list is designated as the majority variant.

The error data field identifies SIDs in the Registry that have a non-zero Count value corresponding to more than one SVID 718 within the SID. Where such a case exists, then variants exist within the word list. Thus, the error data field provides an indication that variants exist within the word list that may trigger a response in an application program or other component responsible for invoking consistency checking. For example, the error data field can be set to a binary one value where more than one variant exists in the word list. Alternatively, the error data field can be set to a binary zero value to indicate that only one spelling for a particular word has been found in the word list.

Mapping a Japanese Word into the Condensed Lexicon Database

The present invention utilizes a mapping method to analyze Japanese text words within a document and to determine the presence of inconsistencies among those words. By utilizing the data tree structure of the CLD, an exemplary embodiment of the present invention maps the reading units of a word (in the form of a RID array) onto the CLD to verify RIDs representing those reading units and to calculate the SID of the word. The method is recursive in that it makes decisions identifying potential RIDs and then modifies the decisions when the mapping process indicates that certain potential RIDs should be eliminated. When a word is successfully mapped onto the CLD, the statistics pertaining to that word are updated in the Registry. When a word is not successfully mapped onto the CLD, the method ceases to process the word and no statistics are updated. Thus, the invention will be described in terms of an exemplary embodiment that utilizes a Mapping Procedure and a Registry Procedure to perform consistency checking on documents containing Japanese text.

In an alternative embodiment, the Dictionary described above, can be generated by the Mapping Procedure described below. Variant generation prepares the Dictionary for use by the Checking Component by mapping the reading units of a word from a list of Japanese words and determining the RID that corresponds to each reading unit. After all of the reading units of the word are assigned a RID, the word can be represented as a RID array. By substituting each reading unit of the word with reading units having the same RID, a number of reading unit combinations (i.e., spelling variants) can be formed for each word. Each reading unit combination formed will have the same SID as all of the other reading unit combinations formed. These reading unit combinations can be stored in the Dictionary for subsequent reference by the Checking Component. In this embodiment, any word that matches with any of the generated combinations will be matched with the appropriate SID and assigned an SVID. The statistics pertaining to that reading unit combination are updated in the Registry.

The Mapping Procedure and Registry Procedure described below are described in the context of consistency checking, rather than variant generation. However, those skilled in the art will appreciate that the same procedure can be applied in either context.

The Mapping Procedure

In an exemplary embodiment of the present invention, the input to the Mapping Procedure will consist of a word list composed of Japanese text. As discussed above, the word list is the output of the Word Breaking Component 204 (FIG. 2) and is returned to the Checking Component 37 (FIG. 2) in response to receiving a sentence of words from the Checking Component 37 (FIG. 2). The Mapping Procedure is a process that traverses the word list in order to break the words in the word list into reading units that can be used to normalize each word in the list. Normalization is the procedure by which a word is assigned a SID. All words that are acceptable spelling variants of one another are assigned the same SID. Thus, after the Mapping Procedure has completely processed the word list, all of the known words within the word list will be normalized, in that all word variants will share the same SID and the entire word list can be processed as a list of SIDs. All unknown words will not be normalized. When an unknown word is encountered within a word list, a FALSE message is generated to the calling program indicating that the consistency of the word has not been evaluated.

The Mapping Procedure performs this normalization by means of a single traversal of the word list. An exemplary method of the present invention is best described by reference to an example. Referring now to FIGS. 8a–8e, a word 800 is represented by a series of English text characters. As before, capital letters are used to represent Kanji reading units and lowercase letters are used to represent Hiragana reading units. Because Hiragana reading units can comprise several individual characters, each Hiragana reading unit is represented in FIG. 8a–8e by a series of lowercase letters with a subscript index number associated with each. Because Kanji reading units comprise only a single character with or without a following okurigana character, they are represented in FIGS. 8a–8e by a single English character.

The first step of the Mapping Procedure is to examine the first character of a word. The characters in any particular word are indexed by means of a character pointer 802. The Mapping Procedure sets the character pointer 802 to the first character. If the first character is determined to be a Kanji character, then the Mapping Procedure recognizes this to be the first reading unit. By searching the root state 610' of the CLD 600', the Mapping Procedure determines all of the possible RIDs by which the reading unit may be represented. There may be more than one RID that could represent the reading unit, because a Kanji reading unit may have a number of different readings. Without knowledge of the word in which the reading unit is used, it cannot be determined which reading is proper and which RID properly represents the reading unit. Therefore, the Mapping Procedure must be recursive in that it must reconsider its decisions regarding the RID applicable to each reading unit, as subsequent reading units are determined. The recursive aspect of the Mapping Procedure will be discussed below in more detail.

Once the potential RIDs have been identified in the root state 610' of the CLD 600', the Mapping Procedure increments the character pointer 802, so that it points to the next character in the word, as depicted in FIG. 8b. The Mapping Procedure then follows the downpointer from the first potential RID in the root state 610' of the CLD 600' to the RIDs in the second state 612' of the CLD 600' pointed to by the downpointer.

The Mapping Procedure compares the remainder of the word (i.e., the portion starting with the current character and ending with the last character of the word, namely, $c_1c_2c_3Ba_1a_2$) to the reading pairs in the RPD 500. This comparison is performed by means of a well-known string comparison routine. By paring down the word 800 (i.e., removing characters from the end of the word) the string-comparison routine will eventually determine that a match does or does not exist between a subset of the remaining portion of the word 800 (e.g., $c_1c_2c_3$) and at least one of the reading pairs in the RID 500. If a match does not exist, then the word 800 cannot be processed by the Mapping Procedure. When the Mapping Procedure cannot match a word 800 to a reading pair, it will return a FALSE message to the calling program indicating that a match could not be made and that no RID array will be returned to the calling program. A misspelled word is an example of a word that cannot be processed by the Mapping Procedure.

When a match is made between a subset of the remainder of the word 800 and the RPD 500, it necessarily represents the next reading unit in the word, because the RPD only contains reading units (within reading pairs). In FIGS. 8a–8e, this next reading unit is represented by the English characters "$c_1c_2c_3$." Once the match is found in the RPD 500, then the RID associated with the reading pair represents the second reading unit of the word 800. Once the second RID has been determined, then the Mapping Procedure can re-examine the RIDs that were designated as potential RIDs for the first reading unit (a potential first RID). If one of the potential first RIDs does not have a downpointer pointing to the now-known second RID, then that potential first RID can be eliminated as a potential first RID. At this point, the potential first RIDs will only be those that have a downpointer pointing to the known second RID. In the example depicted in FIGS. 8b, RID R100 has a downpointer pointing to RID R43, which represents reading unit "$c_1c_2c_3$."

After the potential first RIDs have been re-examined with respect to the second RID, the Mapping Procedure can examine subsequent reading units. Specifically, the character pointer will be incremented to the character following the matched reading pair, as depicted in FIG. 8c. In the example of FIG. 8c, the third reading unit is represented by English character "B". As described above, this character represents a Kanji reading unit. The Mapping Procedure will determine all of the potential RIDs by which the Kanji reading unit is represented. Once the potential third RIDs are determined, the Mapping Procedure will access the CLD 600' to determine whether any of the downpointers, from the second RID, point to any of the potential third RIDs. Any potential third RIDs that are not pointed to be a second RID downpointer can be eliminated as potential third RIDs.

At this point, the first and third reading units have sets of potential RIDs associated with them. The RID for the second reading unit is known. The Mapping Procedure may once again access the CLD 600' and determine whether a path can be identified, traversing the CLD 600' from a potential first RID to the known second RID and then to a potential third RID. If a single path meeting this criteria can be identified, then the first RID and the third RID are determinable. If no path meeting this criteria can be identified, then the word cannot be processed by the Mapping Procedure (e.g., the word is a misspelled word). Finally, if more than one path can be identified, then the first and/or third RIDs are not yet determinable.

The Mapping Procedure can now increment the character pointer to point to the next character. In the example of FIG. 8d, the next character is represented by the English letter "$a_1$". Since the character is a Hiragana character, the Mapping Procedure will compare the remaining portion of the word to the RPD, as described above, to determine the reading unit. In the example of FIG. 8d, the next (and only remaining) reading unit is the Hiragana reading unit "$a_1a_2$". By comparing this reading unit with the RPD, the fourth RID can be determined.

At this point, the RIDs for the first and third reading units can be determined. As described in connection with FIG. 6, only one path will traverse the CLD from a particular RID in the root state, through a particular RID in a terminal state. Therefore, only one first RID and one third RID will satisfy this criteria, and then all RIDs representing the word will be known. Of course, if the word is not a valid word (e.g., misspelled word) then no path can be found and a FALSE message will be returned to the calling program.

Referring now to FIG. 8e, an exemplary responsive message is depicted, representing the output from the Checking Component 37 to the calling program (e.g., the word processing program). After all of the RIDs for each reading unit in the word 800 have been determined, they can be arranged into a RID array. The RID array 804 is simply a string comprising the RIDs concatenated in the order of the reading units in the word 800. When the Mapping Procedure successfully maps the reading pairs of word 800 onto the CLD 600', the Mapping Procedure returns a Reply Message 806 (e.g., TRUE) and the RID array 804 to the calling program.

The SID 808 corresponding to the RID array 804 can also be sent as part of the responsive message. The SID 808 is the unique mapping number defining the path through the CLD 600' over which the RID array 804 was successfully mapped. The structure of the CLD provides for storage of an index number for each node in the data tree structure of the CLD. The SID 808 is generated as a path is traversed through the CLD, by adding the counts of all index numbers of the nodes on the path. This sort of SID 808 generation is a well known means of identifying paths traversing a data tree structure. In an exemplary embodiment of the present invention, the SID 808 is used to normalize all words that are variances of one another. That is, all word variants will have the same SID 808 assigned to them, even if the words are not spelled identically. The SID 808 is used as an identifier in the Registry Procedure which will be discussed in more detail below.

The Registry Procedure

Once a word has been assigned a SID 808, the word can be compared to all other word variants with the same SID 808. The Registry 700, discussed in connection with FIG. 7, is used to maintain statistics on the words contained in a document. Each word that was successfully mapped onto the CLD 600' is assigned a Spelling Variant Identification Number ("SVID"). For a set of words having the same SID, each spelling variant is assigned a unique SVID, so that it can be differentiated from the other word variants with the same SID.

One means of assigning SVIDs to word variants is by representing the word as a binary number string. For example, by using a binary one value to represent a Kanji reading unit and a binary zero value to represent a Hiragana reading unit, each variant can be assigned a unique SVID. The word used as an example in FIG. 8 could be represented by the SVID "1010", representing the Kanji, Hiragana, Kanji, Hiragana arrangement of its reading units.

Once a SVID has been assigned to a word, then the Registry 700 can be updated to reflect the occurrence of that word in the word list. Specifically, the root state 702 of the Registry 700 can be searched until the SID associated with the word in question is found. The Registry Procedure can then search the SVIDs associated with that SID until the SVID matching that of the word is found. When the applicable SVID has been found, the count data field associated with the SVID can be incremented to indicate the occurrence of the word having the SID and SVID corresponding to that count data field. Once a word list has been fully processed by the Mapping Procedure and Registry Procedure, every known word will have been assigned an SID and an SVID, and will have been registered in the Registry 700. The Registry 700 also maintains a majority variant data field 726 and an error data field 724. These data fields maintain the information that most directly relates to the output of the Mapping Procedure and Registry Procedure.

By monitoring the majority variant data field 726 and the error data field 724 in the Registry, the calling program (e.g., word processing program) can identify words within a particular document associated with the Registry that are spelled inconsistently. The calling program may have a Rule List, composed of rules defining the responsiveness of the calling program to a particular error condition. For example, the calling program may be configured to identify all inconsistent words or to identify only those words that are inconsistent with a particular majority variant. Often, the Rule List is configurable by the user. The calling program can access the majority variant data field 726 and the error data field 724 by accessing the Registry, which can be stored in RAM 25 for ready access. Alternatively, the Checking Component 37 may be configured to call an error notification API, that alerts the calling program of a change in error status for one or more words. The data provided by these data fields can be represented to the user by the calling program in a way that conforms to the Rule List.

The majority variant data field 726 maintains the SVID of the variant with the highest value stored in the count data field 722. The majority variant data field 726 is updated any time a count data field 722 corresponding to the same SID is incremented. Thus, the SVID representing the word variant that occurs most commonly in the word list is designated as the majority variant. Depending on the Rule List of the calling program, a minority variant might be marked as questionable by the calling program. Alternatively, when a non-zero count data field exists for more than one SVID within a particular SID, the Rule List may require marking all variants as questionable. In either case, the majority variant data field identifies the majority variant.

The error data field identifies SIDs in the Registry that have a non-zero count data field corresponding to more than one SVID within the SID. Where such a case exists, then variants exist within the word list. Thus, the error data field provides an indicator for the Registry Procedure to recognize that variants exist within the word list that may trigger a response in the calling program (depending on the Rule List). For example, the error data field can be set to a binary one value where more than one variant exists in the word list. Alternatively, the error data field can be set to a binary zero value to indicate that only one spelling for a particular word has been found in the word list.

As discussed above, the Mapping Procedure and Registry Procedure are operated in the background in an exemplary embodiment of the present invention. Thus, the Mapping Procedure may be invoked after each sentence in the document has been entered and the Word-Breaking component has reduced the sentence to a word list. All of the words in the word list are processed by the Mapping Procedure and TRUE messages, FALSE messages, SIDs and RID arrays are returned to the calling program. The Registry Procedure then processes the words in the word list and updates the data fields in the Registry. If the Rule List of the client program is configured to mark all particular variants as questionable, the document may have to be updated to reflect changes in the Registry. For example, if the Rule List is configured to mark minority variants as questionable, then words that were previously marked as questionable may need to be un-marked because they now represent the majority variant of a particular SID.

Review of Detailed Description

Through the use of a Reading Pair Database (RPD) and a Condensed Lexicon Database (CLD), an embodiment of the present invention analyzes Japanese text to detect inconsistencies. A word processing program (or other application program) calls a Checking Component to check for inconsistencies within a sentence of a Japanese text document. The Checking Component, in turn, calls a Word Breaking Component to break the sentence into words in a word list. The Checking Component then analyzes each word, breaks the word into reading units, and assigns a Reading Pair Identification Number (RID) to each reading unit in the word. RIDs are determined by comparing each reading unit in a word to the RPD and then attempting to map the entire word (represented as a series of RIDs—a RID array) onto the CLD.

In an alternative embodiment of the present invention, a Dictionary can be created for looking up the words in a Japanese text document. Instead of mapping each word onto the CLD, the consistency of each word is checked by comparing the word to the entries in the Dictionary. The Dictionary contains all of the acceptable Japanese spelling variants. The generation of the Dictionary is performed by processing a list of input words, breaking the input words into reading units, and assigning a RID to each reading unit in the word. A RID array for each word is generated by comparing each reading unit in the word to the RPD and then attempting to map the entire word (represented as a series of RIDs—a RID array) onto the CLD. Once a successful mapping occurs, the word can be added to the Dictionary. In addition, variants are generated by substituting each reading unit in the word with reading units having the same RID. All of the variants can be stored in the Dictionary for comparison to words found in Japanese text documents. Because variants of the same word will all be assigned the same SID, Japanese text documents can be checked for inconsistencies.

The RID array of a word determines the Sense Identification Number (SID) of the word, thereby permitting the grouping of the word with acceptable spelling variants of the word. Words that are acceptable spelling variants of one another share the same SID, despite having different spellings. The Checking Component maintains a Registry that maintains word occurrence statistics to determine when spelling variants with the same SID exist within a particular document. When such spelling variants do exist, the Checking Component will so indicate in an error data field within the Registry. The word processing program can be configured to monitor the error data field in the Registry to be alerted to the existence of spelling variants within a document.

The present invention has been described in various exemplary embodiments, and particularly as a dynamic-link library. However, those skilled in the computer arts will appreciate that the invention is not limited to the described embodiments, but can be implemented in various embodiments including as an integrated component of an application program. Alternative embodiments will become apparent to those skilled in the art to which the present invention pertains without departing from its spirit and scope. Accordingly, the scope of the present invention is defined by the appended claims rather than the foregoing description.

We claim:

1. A computer-readable medium, comprising:
   a Reading Pair Database (RPD) having a plurality of reading pairs and a plurality of reading pair identification numbers (RIDs), each of the reading pairs including a first reading unit in a first writing system and a second reading unit in a second writing system, each of the RIDs corresponding to one of the reading pairs;
   a Condensed Lexicon Database (CLD) having a data tree including a plurality of nodes and a plurality of downpointers connecting the nodes, each of the nodes containing a RID; and
   computer-executable instructions for performing the steps of:
      identifying one of a plurality of words in a word list as a current word;
      setting a character pointer to a character in the current word;
      accessing the RPD to match at least one reading unit contained in the current word to either the first reading unit or the second reading unit of at least one of the reading pairs in the RPD and retrieving a corresponding one of the RIDs from the RPD;
      reforming each word as a RID array, comprising a set of RIDs representing each reading unit within the current word;
      attempting to map the RID array onto the CLD;
      generating a Reply Message indicating whether the attempt to map the RID array onto the CLD was successful or unsuccessful.

2. The computer-readable medium of claim 1, wherein accessing the RPD comprises the steps of:
   attempting to match at least a portion of the current word to at least one reading pair in the RPD;
   retrieving, in response to a successful match, at least one RID corresponding to the reading pair and moving the character pointer to point to a character following the last character in the portion of the current word;
   reducing, in response to a failed match, the size of the portion of the current word by eliminating at least one character therefrom and repeating the accessing step; and
   including a FALSE indicator within the Reply message, in response to a failed attempt to match at least a portion of the current word to at least one reading pair in the RPD.

3. The computer-readable medium of claim 1, wherein attempting to map the RID array comprises the steps of:
   attempting to match a first RID in the RID array to a RID contained in a first node of the CLD;
   in response to a successful match, determining whether a downpointer from the first node points to a second node containing a second RID corresponding to a second RID adjacent to the first RID in the RID array;
   in response to a determination that the second node contains the second RID, repeating the attempting to match and determining steps until every RID in the RID array has been matched to a corresponding node of the CLD and all corresponding nodes are connected by downpointers, thereby defining a node path.

4. The computer-readable medium of claim 3, further comprising the step of:
   generating a Sense Identification Number (SID), in response to a successful attempt to map the RID array onto the CLD.

5. The computer-readable medium of claim 4, wherein each node in the CLD has a corresponding index number and wherein the step of generating a SID comprises the step of:
   adding together each corresponding index number for each node in the node path.

6. The computer-readable medium of claim 5, further comprising a Registry for maintaining an occurrence count for a word in the document.

7. The computer-readable medium of claim 6, wherein each spelling variant of the word is assigned a unique Spelling Variant Identification Number (SVID).

8. The computer-readable medium of claim 7, wherein the Registry contains a root node for every unique SID, and wherein each root node has a downpointer pointing to at least one SVID node.

9. The computer-readable medium of claim 8, wherein each SVID node has a downpointer pointing to at least one count node, each count node having a count value representing a number of occurrences of the word within the document.

10. The computer-readable medium of claim 9, wherein at least one root node has a downpointer pointing to a majority variant node, the majority variant node containing an SVID corresponding to a count node having the highest count value of all count nodes corresponding to the SID.

11. The computer-readable medium of claim 9, wherein at least one root node has a downpointer pointing to an error node, the error node containing an indicator for identifying the occurrence of more than one non-zero count value in the count nodes corresponding to the SID.

12. The computer-readable medium of claim 1, wherein the first writing system is Kanji and the second writing system is Hiragana.

13. The computer readable medium of claim 12, wherein the first reading unit and the second reading unit are equivalents in at least one Japanese word.

14. A method for checking the consistency of a plurality of words contained in a word list, the method comprising the steps of:
   isolating at least one reading unit within each word;
   assigning each reading unit a Reading Pair Identification Number (RID);
   reforming each word as an array of RIDs;
   attempting to map each RID array onto a Compressed Lexicon Database (CLD), the CLD having a plurality of RIDs contained within nodes of a data tree structure;
   generating a Reply Message indicating whether the attempt to map the RID array onto the CLD was successful or unsuccessful;
   in response to a successful mapping of a plurality of RID arrays onto the CLD, assigning a Sense Identification (SID) and a Spelling Variant Identification (SVID) to each word represented by a RID array; and
   in response to a determination that a first word and a second word have the same SID but different SVIDs, indicating the determination in an error field.

15. The method of claim 14, wherein the assigning step comprises the steps of:
   attempting to match the at least one reading unit of each word to a reading pair contained in a Reading Pair Database (RPD);
   retrieving a RID from the RPD, the RID corresponding to the reading pair.

16. The method of claim 15, wherein at least one reading pair in the RPD comprises a Kanji reading unit and a Hiragana reading unit, the Kanji reading unit and the Hiragana reading units being equivalents in at least one Japanese word.

17. The method of claim 14, wherein the attempting to map step comprises the steps of:
   attempting to match a first RID in the RID array to a RID contained in a first node of the CLD;
   in response to a successful match, determining whether a downpointer from the first node points to a second node containing a second RID corresponding to a second RID adjacent to the first RID in the RID array;
   in response to a determination that the second node contains the second RID, repeating the attempting to match and determining steps until every RID in the RID array has been matched to a corresponding node of the CLD and all corresponding nodes are connected by downpointers, thereby defining a node path.

18. The method of claim 17, further comprising the step of:
   generating a Sense Identification Number (SID) in response to a successful attempt to map the RID array onto the CLD.

19. The method of claim 14, further comprising the step of:
   maintaining a Registry for a plurality of occurrence statistics.

20. The method of claim 19, wherein the occurrence statistics include a count value corresponding to each SVID.

21. The method of claim 20, wherein the occurrence statistics include a majority variant field for identifying a most frequent SVID.

22. A method for generating common spelling variants for a plurality of words, contained in a word list, the method comprising the steps of:
   receiving a first list containing a plurality of words, each word comprising at least one first reading unit;
   receiving a second list containing a plurality of words, each word comprising at least one second reading unit and corresponding to a word in the first list;
   analyzing each word in the first list and isolating the at least one first reading unit therein;
   analyzing each word in the second list and isolating the at least one second reading unit therein;
   correlating the at least one first reading unit of each word in the first list with the at least one second reading unit of each word in the second list, thereby forming a reading pair;
   assigning a reading pair identification number (RID) to the reading pair;
   correlating the at least one first reading unit of each word in the first list with a third reading unit corresponding to the RID;
   substituting the third reading unit for the first reading unit in the first word, thereby forming a third word; and
   storing the third word in a Dictionary.

23. The method of claim 22, wherein the words contained in the first list and the words contained in the second list comprise Japanese language text.

24. The method of claim 23, wherein the Japanese language text comprises characters selected from the group consisting of Hiragana, Kanji, and Okurigana.

25. The method of claim 22, wherein analyzing each word in the first list comprises the steps of:
   identifying reading unit boundaries within each word;
   storing the at least one first reading unit contained within the reading unit boundaries;
   determining whether the at least one first reading unit is a new reading unit;
   in response to a determination that the at least one first reading unit is not the new reading unit, incrementing an existing reading unit count corresponding to the at least one first reading unit; and
   in response to a determination that the at least one first reading unit is the new reading unit, creating a new reading unit count.

26. The method of claim 25, wherein the analyzing, correlating, and assigning steps are repeated until the existing reading unit count has been created for each reading unit contained in the list of words.

27. The method of claim 22, wherein analyzing each word in the first list comprises the steps of:

identifying reading unit boundaries within each word;

storing the at least one second reading unit contained within the reading unit boundaries;

determining whether the at least one second reading unit is a new reading unit;

in response to a determination that the at least one second reading unit is not the new reading unit, incrementing an existing reading unit count corresponding to the at least one second reading unit; and in response to a determination that the at least one second reading unit is the new reading unit, creating a new reading unit count.

28. The method of claim 22, wherein the correlating step comprises the steps of:

comparing the first reading unit with the second reading unit;

determining whether the first reading unit is an equivalent to the second reading unit; and in response to a determination that the first reading unit is an equivalent to the second reading unit, storing the first reading unit and the second reading unit together as a reading pair.

29. A method for generating a Reading Pair Database (RPD) comprising the steps of:

receiving a first list containing a plurality of words, each word comprising at least one first reading unit;

receiving a second list containing a plurality of words, each word comprising at least one second reading unit and corresponding to a word in the first list;

analyzing each word in the first list and isolating the at least one first reading unit therein;

analyzing each word in the second list and isolating the at least one second reading unit therein;

correlating the at least one first reading unit of each word in the first list with the at least one second reading unit of each word in the second list, thereby forming a reading pair;

assigning a reading pair identification number (RID) to the reading pair; and adding the reading pair and the RID to the RPD.

30. The method of claim 29, wherein the words contained in the first list and the words contained in the second list comprise Japanese language text.

31. The method of claim 30, wherein the Japanese language text comprises characters selected from the group consisting of Hiragana, Kanji, Okurigana, and Katakana.

32. The method of claim 29, wherein analyzing each word in the first list comprises the steps of:

identifying reading unit boundaries within each word;

storing the at least one first reading unit contained within the reading unit boundaries;

determining whether the at least one first reading unit is a new reading unit;

in response to a determination that the at least one first reading unit is not the new reading unit, incrementing an existing reading unit count corresponding to the at least one first reading unit; and in response to a determination that the at least one first reading unit is the new reading unit, creating a new reading unit count.

33. The method of claim 32, wherein the analyzing, correlating, and assigning steps are repeated until the existing reading unit count has been created for each reading unit contained in the list of words.

34. The method of claim 29, wherein analyzing each word in the first list comprises the steps of:

identifying reading unit boundaries within each word;

storing the at least one second reading unit contained within the reading unit boundaries;

determining whether the at least one second reading unit is a new reading unit;

in response to a determination that the at least one second reading unit is not the new reading unit, incrementing an existing reading unit count corresponding to the at least one second reading unit; and in response to a determination that the at least one second reading unit is the new reading unit, creating a new reading unit count.

35. The method of claim 29, wherein the correlating step comprises the steps of:

comparing the first reading unit with the second reading unit;

determining whether the first reading unit is an equivalent to the second reading unit; and in response to a determination that the first reading unit is an equivalent to the second reading unit, storing the first reading unit and the second reading unit together as a reading pair.

36. A computer readable medium having stored thereon a data structure comprising:

a plurality of first data fields, each first data field containing a Reading Pair Identification Number (RID);

a plurality of second data fields corresponding to the first data fields, each second data field containing a reading pair;

wherein each reading pair comprises a first reading unit and a second reading unit;

wherein each first reading unit in the reading pair is an equivalent to the second reading unit in the reading pair and;

wherein the RID corresponding to the reading pair is operative to denote the equivalence of the first reading unit and the second reading unit.

37. The computer-readable medium of claim 36, wherein each first data field contains a unique RID.

38. The computer-readable medium of claim 37, wherein the first reading unit and the second reading unit comprise Japanese text.

39. The computer-readable medium of claim 38, wherein the first reading unit and the second reading unit comprise characters selected from the group consisting of Hiragana, Kanji, Okurigana, and Katakana.

* * * * *